(12) United States Patent
Park et al.

(10) Patent No.: US 11,329,725 B2
(45) Date of Patent: May 10, 2022

(54) DEVICE SYSTEM FOR CONSTITUTING 3D IMAGE SENSOR CAPABLE OF WIRELESS DATA TRANSMISSION AND RECEPTION BASED ON OPTICAL PHASED ARRAY

(71) Applicant: Korea Advanced Institute of Science and Technology, Daejeon (KR)

(72) Inventors: HyoHoon Park, Daejeon (KR); Joonsup Shim, Daejeon (KR); Seonghwan Kim, Daejeon (KR); Hyun-Woo Rhee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 70 days.

(21) Appl. No.: 17/010,277

(22) Filed: Sep. 2, 2020

(65) Prior Publication Data

US 2021/0067251 A1 Mar. 4, 2021

(30) Foreign Application Priority Data

Sep. 2, 2019 (KR) .......................... 10-2019-0108295

(51) Int. Cl.
*H04B 10/40* (2013.01)
*H04Q 11/00* (2006.01)
*H04B 10/11* (2013.01)

(52) U.S. Cl.
CPC .............. *H04B 10/40* (2013.01); *H04B 10/11* (2013.01); *H04Q 11/0005* (2013.01);
(Continued)

(58) Field of Classification Search
CPC ..... H04B 10/40; H04B 10/11; H04Q 11/0005; H04Q 2011/0016; H04Q 2011/0018; H04Q 2011/0026; H04Q 2213/011
(Continued)

(56) References Cited

U.S. PATENT DOCUMENTS

2018/0156661 A1\* 6/2018 Doylend ................ G01B 11/22
2018/0188452 A1\* 7/2018 Sun ........................ G01S 7/4817
(Continued)

FOREIGN PATENT DOCUMENTS

JP 2007174484 A 7/2007
KR 1020170021966 A 3/2017
(Continued)

*Primary Examiner* — Dalzid E Singh
(74) *Attorney, Agent, or Firm* — Burns & Levinson, LLP; Joseph M. Maraia (57) ABSTRACT

A device system for constituting a 3D image sensor based on optical phased array is provided. The device system includes an optical modulator that is integrated on the same photonic integrated circuit (PIC) chip as a laser diode array with different output wavelengths and a multiplexer for transmitting an optical wave having a wavelength selected from the laser diode array to an optical waveguide and modulates the optical wave into a specific optical signal, an optical phased array that radiates the optical signal received via an optical switch to the free space using a tunable transmit and receive (TRx) antenna array, and a photodetector that converts an Rx optical signal received by a Tx optical signal transmitted via the optical phased array into an electrical signal.

16 Claims, 10 Drawing Sheets

(52) U.S. Cl.
CPC ............... *H04Q 2011/0016* (2013.01); *H04Q 2011/0018* (2013.01); *H04Q 2011/0026* (2013.01); *H04Q 2213/011* (2013.01)

(58) Field of Classification Search
USPC .......................................................... 398/48
See application file for complete search history.

(56) References Cited

U.S. PATENT DOCUMENTS

2018/0356705 A1\* 12/2018 Park ....................... G02F 1/2955
2019/0170875 A1\* 6/2019 Schmalenberg ......... G01S 17/42
2020/0150240 A1\* 5/2020 Huwer ................... G01S 7/4863
2021/0018603 A1\* 1/2021 Lu .......................... G01S 7/4815

FOREIGN PATENT DOCUMENTS

| KR | 1020170058219 A | 5/2017 |
| KR | 1020170115903 A | 10/2017 |

\* cited by examiner

DEVICE SYSTEM FOR CONSTITUTING 3D IMAGE SENSOR CAPABLE OF WIRELESS DATA TRANSMISSION AND RECEPTION BASED ON OPTICAL PHASED ARRAY

CROSS-REFERENCE TO RELATED APPLICATIONS

A claim for priority under 35 U.S.C. § 119 is made to Korean Patent Application No. 10-2019-0108295 filed on Sep. 2, 2019, in the Korean Intellectual Property Office, the entire contents of which are hereby incorporated by reference.

BACKGROUND

Embodiments of the inventive concept described herein relate to a device system for constituting a three-dimensional (3D) image sensor based on optical phased array (OPA) performing acquisition of image, location, and operation information and wireless data transmission and reception at the same time, and more particularly, relate to technologies of integrating an optical modulator and a photodetector together on the same photonic integrated circuit (PIC) chip as an optical phased array and facilitating wireless transmission and reception of a modulated optical signal on the free space.

An optical phased array is a device capable of steering beams in a desired direction and radiating the beams to the free space on a single chip without a component, which mechanically rotates and moves, in such a manner as to input an optical wave, a phase of which is accurately controlled, to the array of devices which emit optical waves. Compared with a system which steers a radiation direction of beams using a conventional mechanical rotating part, a micro-electro-mechanical systems (MEMS) device, or the like, the optical phased array has characteristics of having excellent durability and excellent operation reliability because there is no component which rotates and moves mechanically and may reduce unit cost of manufacture of the device by being easily manufactured on the semiconductor chip using a modern semiconductor process. Thanks to such advantages, the optical phased array has been actively studied in academia and business as an advanced sensor device in a utilization field, such as vehicles, drones, or robots which are targets of the autonomous driving technology and an application field such as IoT.

The optical phased array which uses the semiconductor integrated technology up to the present has been focused on a transmit (Tx)-OPA technology for providing only a Tx function to be researched and developed. Thus, to apply an OPA-based sensor to a real system, a separate receiver which receives light reflected and returned from an object is essentially required.

Therefore, because a conventional optical phased array separately uses an external optical modulator, a size of which is very large as compared with a scale of the PIC chip where the optical phased array is disposed, as well as requiring a separate receiver other than a transmitter, this has a large limit in terms of constructing a commercial, practical system.

SUMMARY

Embodiments of the inventive concept provide a device system for constituting a 3D image sensor based on optical phased array, which is capable of performing wireless data transmission and reception of an optical signal modulated in a wide viewing angle on a photonic integrated circuit (PIC) chip to simultaneously address the inefficiency of an existing Tx optical phased array, which needs a separate receiver and should use a separate external optical modulator when performing wireless data communication using the optical phased array.

According to an exemplary embodiment, a device system for constituting a 3D image sensor capable of performing wireless data transmission and reception of a modulated optical signal based on optical phased array may include an optical modulator that is integrated on the same photonic integrated circuit (PIC) chip as a laser diode array with different output wavelengths and a multiplexer for transmitting an optical wave having a wavelength selected from the laser diode array to an optical waveguide and modulates the optical wave into a specific optical signal, an optical phased array that radiates the optical signal received via an optical switch to the free space using a tunable transmit and receive (TRx) antenna array, and a photodetector that converts an Rx optical signal received by a Tx optical signal transmitted via the optical phased array into an electrical signal.

The optical phased array may include the tunable TRx antenna array indicating a shape of a grating antenna array connected to each output port of the optical switch. A grating period value of the grating antenna array may be differently designed and arranged in a plurality of optical phased arrays.

The optical phased array may place a p or n type doped slab region between respective antennas constituting the tunable TRx antenna array and may expand a TRx viewing angle range in a vertical direction depending on doping type arrangement of the slab region.

The optical modulator may have a structure constructed based on a Mach-Zehnder interferometer or a ring resonator.

The Rx optical signal may be converted and detected into an electrical signal through the optical switch by means of the photodetector connected to one of input ports of the optical switch.

The device system may further include a plurality of single wavelength light sources that expand a wireless transmission and reception viewing angle of the optical signal.

The optical modulator and the photodetector may be integrated and arranged together on the same PIC chip as the optical phased array to perform the wireless data transmission and reception of the optical signal on the free space.

Transmission and reception in a vertical direction of the Tx optical signal may be performed using the optical phased array having a grating antenna array of different grating periods, the grating antenna array being connected to each output port of the optical switch.

The laser diode array may select one of optical waves, each of which has a different wavelength, and may change a TRx angle in a vertical direction. The tunable TRx antenna array may play a role as transmission and reception of an angle range corresponding to the changed TRx angle range. The optical phased array may expand a TRx viewing angle range for a vertical direction of the Tx optical signal.

According to an exemplary embodiment, a device system for constituting a 3D image sensor capable of performing wireless data transmission and reception of a modulated optical signal based on optical phased array may include a laser diode array that includes a plurality of laser diodes, each of which has a different output wavelength, a multiplexer that receives an optical wave having a wavelength selected among optical waves, each of which has a different wavelength, from the laser diode array through each optical waveguide and transmits the received optical wave to one optical waveguide, an optical modulator that is integrated on the same PIC chip as the laser diode array and the multiplexer to modulate the optical wave into a specific optical signal, an optical switch that selectively transmit and receive the optical signal modulated through the optical modulator with a specific output port of an optical phased array, a tunable TRx antenna array that constitutes the optical phased array and radiates the optical signal incident to any optical phased array through the optical switch to the free space, and a photodetector that converts an Rx optical signal received by a Tx optical signal transmitted via the tunable TRx antenna array into an electrical signal.

The multiplexer may be formed in a structure based on a Y-branch optical waveguide or a structure based on a ring resonator.

The structure based on the Y-branch optical waveguide may include a tapered optical waveguide and an inverse tapered optical waveguide.

The structure based on the ring resonator may include a plurality of ring resonators, each of which is formed with a different radius.

The optical switch may be disposed in a plurality of multiple stages or may be implemented as one device.

According to an exemplary embodiment, a device system for constituting a 3D image sensor capable of performing wireless data transmission and reception of a modulated optical signal based on optical phased array may include an optical modulator that is integrated on the same photonic integrated circuit (PIC) chip as a laser diode array with different output wavelengths and a multiplexer for transmitting an optical wave having a wavelength selected from the laser diode array to an optical waveguide and modulates the optical wave into a specific optical signal, an optical phased array that radiates the optical signal received via an optical switch to the free space using a tunable TRx antenna array, and a photodetector that converts an Rx optical signal received by a Tx optical signal transmitted via the optical phased array into an electrical signal. The optical phased array may include the tunable TRx antenna array indicating a shape of a grating antenna array connected to each output port of the optical switch. A grating period value of the grating antenna array may be differently designed and arranged in a plurality of optical phased arrays.

The optical phased array may supply voltage or current to the grating antenna array to change an effective refractive index of a grating antenna constituting the grating antenna array and may expand a viewing angle range in a vertical direction of the grating antenna to transmit and receive the optical signal.

According to an exemplary embodiment, a device system for constituting a 3D image sensor capable of performing wireless data transmission and reception of a modulated optical signal based on optical phased array may include an optical modulator that is integrated on the same photonic integrated circuit (PIC) chip as a laser diode array with different output wavelengths and a multiplexer for transmitting an optical wave having a wavelength selected from the laser diode array to an optical waveguide and modulates the optical wave into a specific optical signal, an optical phased array that radiates the optical signal received via an optical switch to the free space using a tunable TRx antenna array, and a photodetector that converts an Rx optical signal received by a Tx optical signal transmitted via the optical phased array into an electrical signal. The optical phased array may place a p or n type doped slab region between respective antennas constituting the tunable TRx antenna array and may expand a TRx viewing angle range in a vertical direction depending on doping type arrangement of the slab region.

The optical phased array may change effective refractive indexes of the respective antennas for transmission and reception using an electro-optic or thermo-optic effect depending on the doping type arrangement of the slap region to expand a TRx viewing angle in a vertical direction according to a normal direction of an antenna surface.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments according to the inventive concept will be described in detail with reference to the accompanying drawings. However, the inventive concept is restricted or limited to embodiments of the inventive concept. Further, like reference numerals shown in each drawing indicates like members.

Further, the terminology used in the specification may be terms used to properly represent an exemplary embodiment of the inventive concept and may vary according to intention of a viewer or an operator or custom of a field included in the inventive concept. Therefore, the terminology will be defined based on contents across the specification.

Figure 1:
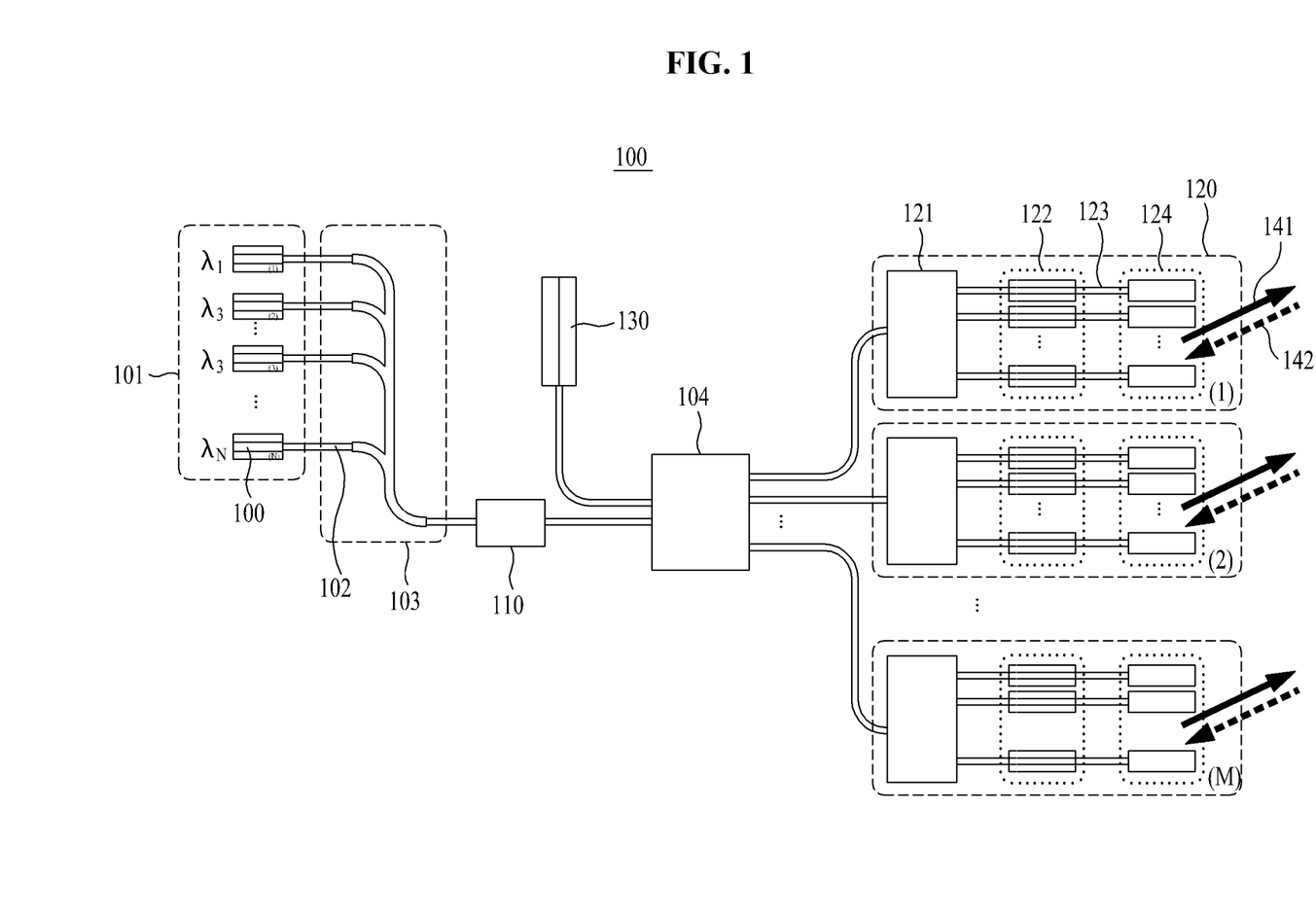
FIG. 1 is a drawing schematically illustrating a device system for constituting a 3D image sensor capable of performing wireless data transmission and reception of a modulated optical signal based on optical phased array according to an embodiment of the inventive concept.

FIG. 1 is a drawing schematically illustrating a device system for constituting a 3D image sensor capable of performing wireless data transmission and reception of a modulated optical signal based on optical phased array according to an embodiment of the inventive concept.

Referring to FIG. 1, a device system 100 for constituting a 3D image sensor capable of performing wireless data transmission and reception of a modulated optical signal based on optical phased array according to an embodiment of the inventive concept may integrate an optical modulator 110, an optical phased array 120, and a photodetector 130 together on a photonic integrated circuit (PIC) chip to facilitate wireless transmission and reception of a modulated optical signal on the free space.

The device system 100 for constituting the 3D image sensor capable of performing the wireless data transmission and reception of the modulated optical signal based on the optical phased array according to an embodiment of the inventive concept may expand a wireless transmission and reception viewing angle of an optical signal using a plurality of single wavelength light sources.

The optical modulator 110 may be integrated on the same PIC chip as a laser diode array 101 with different output wavelengths and a multiplexer 103 which transmits an optical wave having a wavelength selected from the laser diode array 101 to an optical waveguide 102 to modulate the optical wave into a specific optical signal.

The optical phased array 120 may radiate an optical signal, received through an optical switch 104, to the free space using a tunable transmit and receive (TRx) antenna array 124.

The photodetector 130 may convert an Rx optical signal received by a Tx optical signal transmitted via the optical phased array 120 into an electrical signal. In this case, the Rx optical signal may be converted and detected into an electrical signal through the optical switch 104 by means of the photodetector 130 connected to one of input ports of the optical switch 104.

The device system 100 for constituting the 3D image sensor capable of performing the wireless data transmission and reception of the modulated optical signal based on the optical phased array according to an embodiment of the inventive concept may perform transmission and reception in a vertical direction of a Tx optical signal using the optical phased array 120 having a grating antenna array of different grid periods, which is connected to each output port of the optical switch 104. In detail, the device system 100 for constituting the 3D image sensor capable of performing the wireless data transmission and reception of the modulated optical signal based on the optical phased array according to an embodiment of the inventive concept may select one of optical waves, each of which has a different wavelength, through the laser diode array 101 to change a TRx angle in a vertical direction, may play a role as transmission and reception of an angle range corresponding to the changed TRx angle range using the tunable TRx antenna array 124, and may expand a TRx viewing angle range for the vertical direction of the Tx optical signal using the optical phased array 120.

Referring to FIG. 1, the laser diode array 101 may include a plurality of laser diodes 105, each of which has a different output wavelength, and each of the laser diodes 105 may be connected with the multiplexer 103 via the optical waveguide 102.

The multiplexer 103 may receive an optical wave having a wavelength selected among optical waves, each of which has a different wavelength, from the laser diode array 101 through each optical waveguide 102 and may transmit the received optical wave to one optical waveguide. The structure of the 1×N laser diode array 101 and the multiplexer 103 connected therewith is not practical in terms of commercialization because a technical difficulty level of light source integration capable of modulating a wavelength on the PIC chip is significantly high, but the device system 100 according to an embodiment of the inventive concept may be a problem resolution alternative thereto. Thus, when integrating and using a light source capable of modulating a wavelength, it is safe not to use the structure of the 1×N laser diode array 101 and the multiplexer 103.

A description will be given of a method for driving the device system 100 for constituting the 3D image sensor based on the optical phased array capable of performing the wireless data transmission and reception of the modulated optical signal, which is presented in an embodiment of the inventive concept, with reference to FIG. 1. An optical wave selectively having one of $\lambda_1, \lambda_2, \lambda_3, \ldots, \lambda_N$ from each laser diode 105 constituting the 1×N laser diode array 101 may be waveguided through the optical waveguide 102 to be incident to the multiplexer 103. The optical wave incident to the multiplexer 103 may be modulated into a specific optical signal through the optical modulator 110. The modulated Tx optical signal may be incident to one 1×K optical phased array 120 among first to Mth optical phased arrays through the 2×M optical switch 104 to be radiated (or transmitted) to the free space through the tunable TRx antenna array 124 constituting the optical phased array 120 (see reference numeral 141).

Thus, the optical signal 141 radiated to the free space may be reflected from a specific object and may then be incident (or received) to one 1×K optical phased array 120 among the first to Mth optical phased arrays through the tunable TRx antenna array 124 (see reference numeral 142). Thereafter, the Rx optical signal 142 may be converted and detected into an electrical signal through the 2×M optical switch 104 by means of the photodetector 130 connected to one of input ports of the optical switch 104.

As will be described below, the device system 100 for constituting the 3D image sensor capable of performing the wireless data transmission and reception of the modulated optical signal based on the optical phased array according to an embodiment of the inventive concept may roughly divide the structure of device arrangement into three structures to perform wireless data transmission and reception of an optical signal modulated in a wide viewing angle range.

First, the device system 100 for constituting the 3D image sensor capable of performing the wireless data transmission and reception of the modulated optical signal based on the optical phased array according to an embodiment of the inventive concept may arrange the structure of the 1×N laser diode array 101 such that each laser diode 105 selects an optical wave having one of $\lambda_1, \lambda_2, \lambda_3, \ldots, \lambda_N$.

Secondly, the device system 100 for constituting the 3D image sensor capable of performing the wireless data transmission and reception of the modulated optical signal based on the optical phased array according to an embodiment of the inventive concept may arrange the 2×M optical switch 104 and may input an optical wave having one of $\lambda_1, \lambda_2, \lambda_3, \ldots, \lambda_N$ to one 1×K optical phased array 120 among first to Mth optical phased arrays, each of which has the tunable TRx antenna array 124 having a grating form of a $\Lambda_1, \Lambda_2, \ldots, \Lambda_M$ period structure.

Thirdly, the device system 100 for constituting the 3D image sensor capable of performing the wireless data transmission and reception of the modulated optical signal based on the optical phased array according to an embodiment of the inventive concept may arrange a p or n type doped slab region or a p+ or n+ type doped slab region between respective i type grating antennas constituting the tunable TRx antenna array 124 and may arrange an electrode on it.

By arranging the device with the structure, the device system 100 according to an embodiment of the inventive concept may change an effective refractive index of an i type grating antenna using an electro-optic effect or a thermo-optic effect to continuously change a vertical direction angle of a TRx optical signal.

In other words, when suitably using the above-mentioned three device arrangement structures, the device system 100 according to an embodiment of the inventive concept may perform wireless data transmission and reception of an optical signal modulated using a vertical direction viewing angle range which is wide.

Figure 2A:
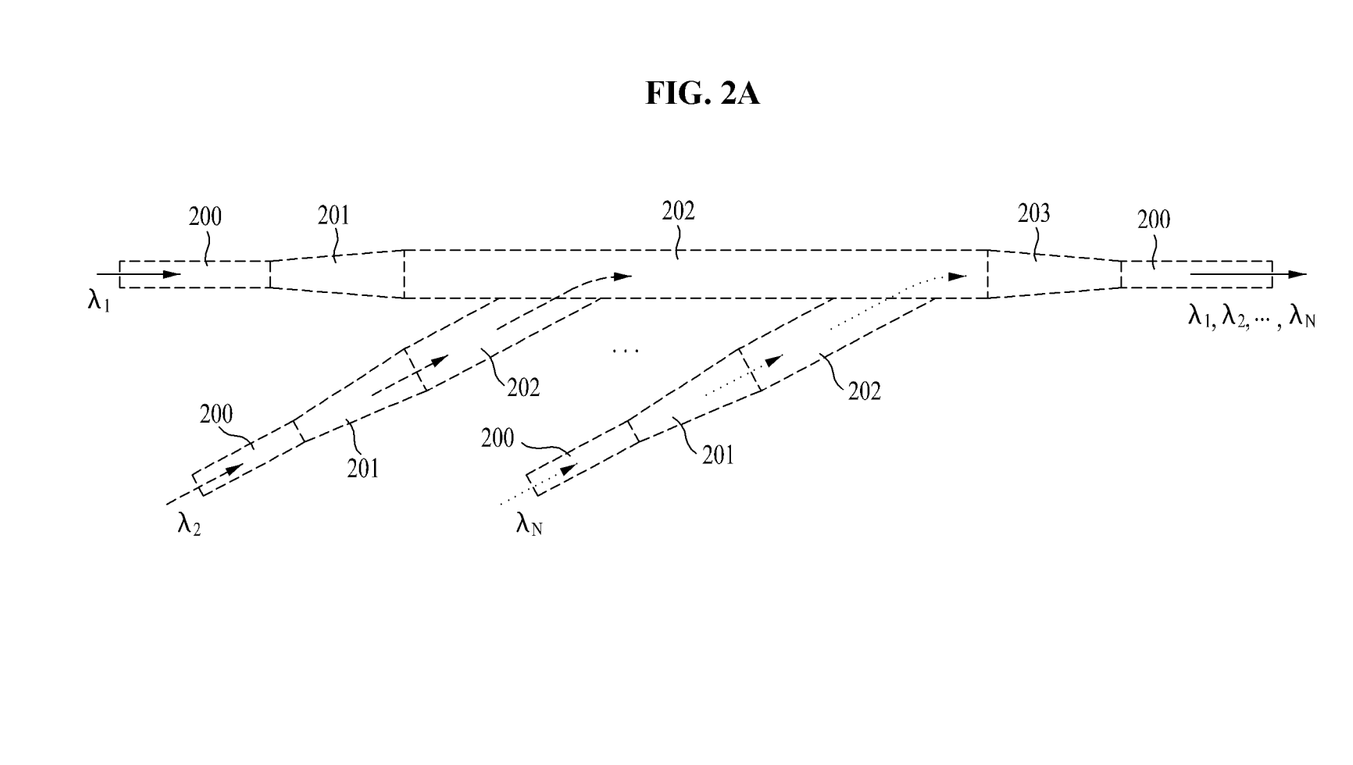
FIGS. 2A and 2B are drawings schematically illustrating a structure of a multiplexer according to an embodiment of the inventive concept.
Figure 2B:
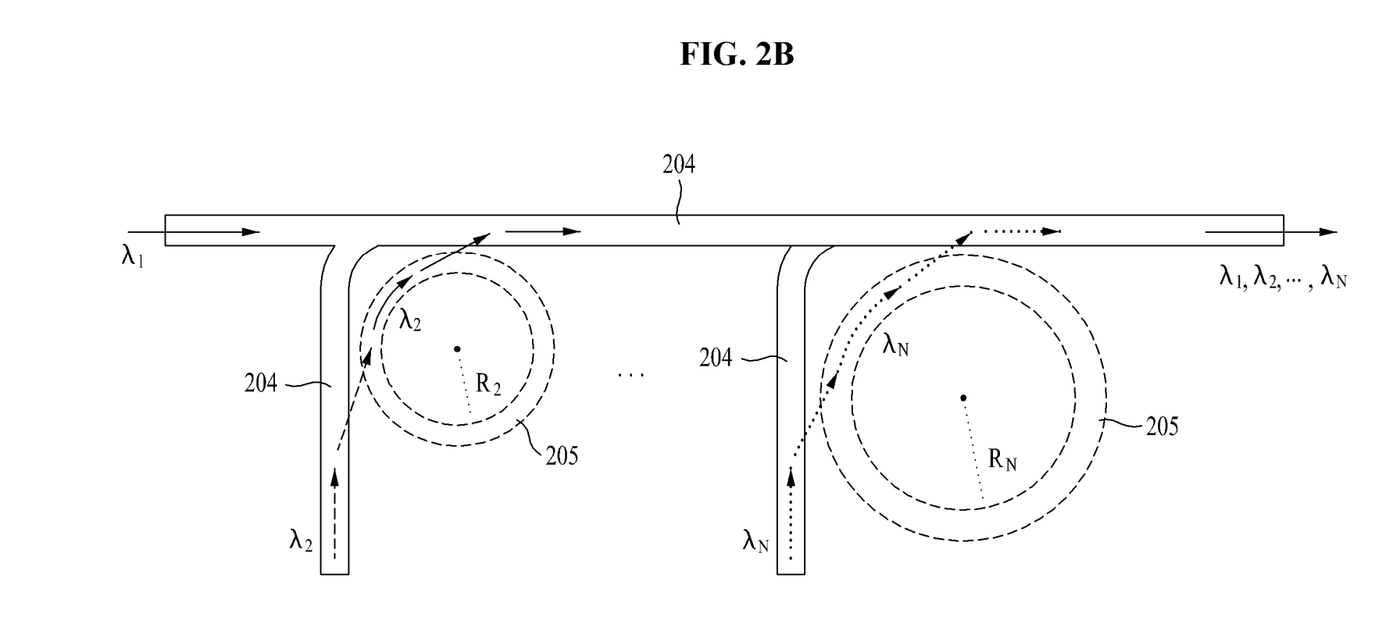

FIGS. 2A and 2B are drawings schematically illustrating a structure of a multiplexer according to an embodiment of the inventive concept.

In detail, FIG. 2A illustrates a structure of a multiplexer based on a Y-branch optical waveguide in a device system according to an embodiment of the inventive concept, and FIG. 2B illustrates a structure of a multiplexer based on a ring-resonator in a device system according to an embodiment of the inventive concept.

FIGS. 2A and 2B indicate detailed examples usable as the structure of a multiplexer 103 shown in FIG. 1.

Referring to FIG. 2A, an optical wave having one of $\lambda_1$, $\lambda_2$, $\lambda_3$, ..., $\lambda_N$ from each laser diode constituting a 1×N laser diode may be incident to an optical waveguide 200 allocated to receive an optical wave having each wavelength and may be waveguided through a taper optical waveguide 201 and a center optical waveguide 202 which is relatively wide. Thereafter, the optical wave may be waveguided to the optical waveguide 200 having the previous width through an inverse tapered optical waveguide 203.

Herein, as shown in FIG. 2A, using the tapered optical waveguide 201 and the inverse tapered optical waveguide 203 through the Y-branch-based multiplexer structure may be to reduce the insertion loss of the multiplexer. Furthermore, an embodiment of the inventive concept may adjust width of the optical waveguide 200 or 202 using the tapered optical waveguide 201 and the inverse tapered optical waveguide 203.

Referring to FIG. 2B, like FIG. 2A, the optical wave having one of $\lambda_1$, $\lambda_2$, $\lambda_3$, ..., $\lambda_N$ from each laser diode constituting the 1×N laser diode array may be incident to an optical waveguide 204 allocated to receive an optical wave having each wavelength. In this case, when an optical wave having a wavelength of $\lambda_1$ is incident, it may be waveguided while resonance with a ring resonator having a radius of $R_2$, $R_3$, ..., or $R_N$ does not occur. On the other hand, when an optical wave having a wavelength of $\lambda_1$, $\lambda_2$, $\lambda_3$, ..., $\lambda_N$ is incident, as shown in FIG. 2B, it may be waveguided through adjacent ring resonators 205, which are designed and allocated with suitable radii $R_2$, $R_3$, ..., and $R_N$, respectively.

In this case, as shown in FIG. 2B, the device system according to an embodiment of the inventive concept may differently implement radii of ring resonators, thus reducing the insertion loss of the multiplexer.

Figure 3A:
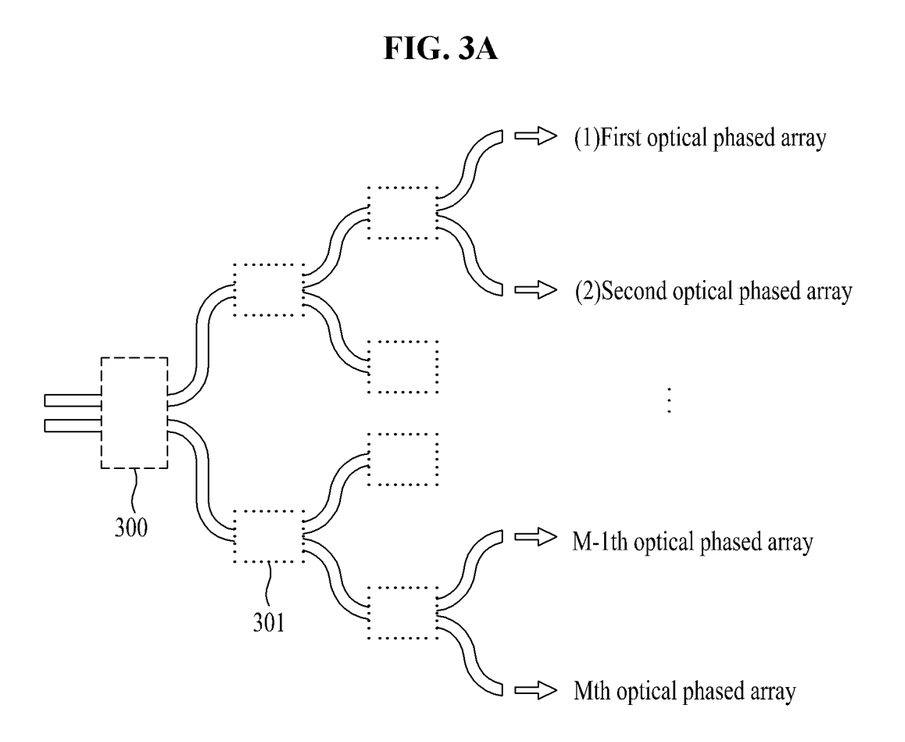
FIGS. 3A and 3B are drawings schematically illustrating a structure of an optical switch according to an embodiment of the inventive concept.
Figure 3B:
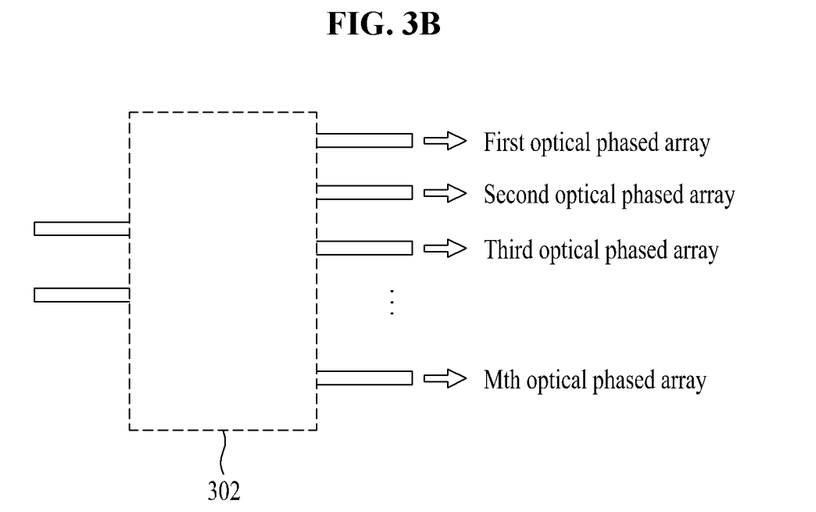

FIGS. 3A and 3B are drawings schematically illustrating a structure of an optical switch according to an embodiment of the inventive concept.

In detail, FIGS. 3A and 3B are drawings schematically illustrating a structure of a 2×M optical switch 104 of FIG. 1. An optical wave having one of $\lambda_1$, $\lambda_2$, $\lambda_3$, ..., $\lambda_N$ incident through a multiplexer 103 may be selected and output to one of M output ports through a 2×M optical switch 104 and may be incident to one 1×K optical phased array 120 among first to Mth optical phased arrays allocated to the respective output ports.

In this case, FIG. 3A is a drawing schematically illustrating a structure of arranging a plurality of 1×2 optical switches 301 in multiple stages behind a 2×2 optical switch 300 and playing a role as the 2×M optical switch 104, and FIG. 3B is a drawing schematically illustrating a structure of playing a role as the 2×M optical switch 104 using one device 302.

Herein, other than the above-mentioned two structures, it may be replaced with a device of another structure, which is capable of playing a role as the 2×M optical switch suitable for an embodiment of the inventive concept.

Figure 4:
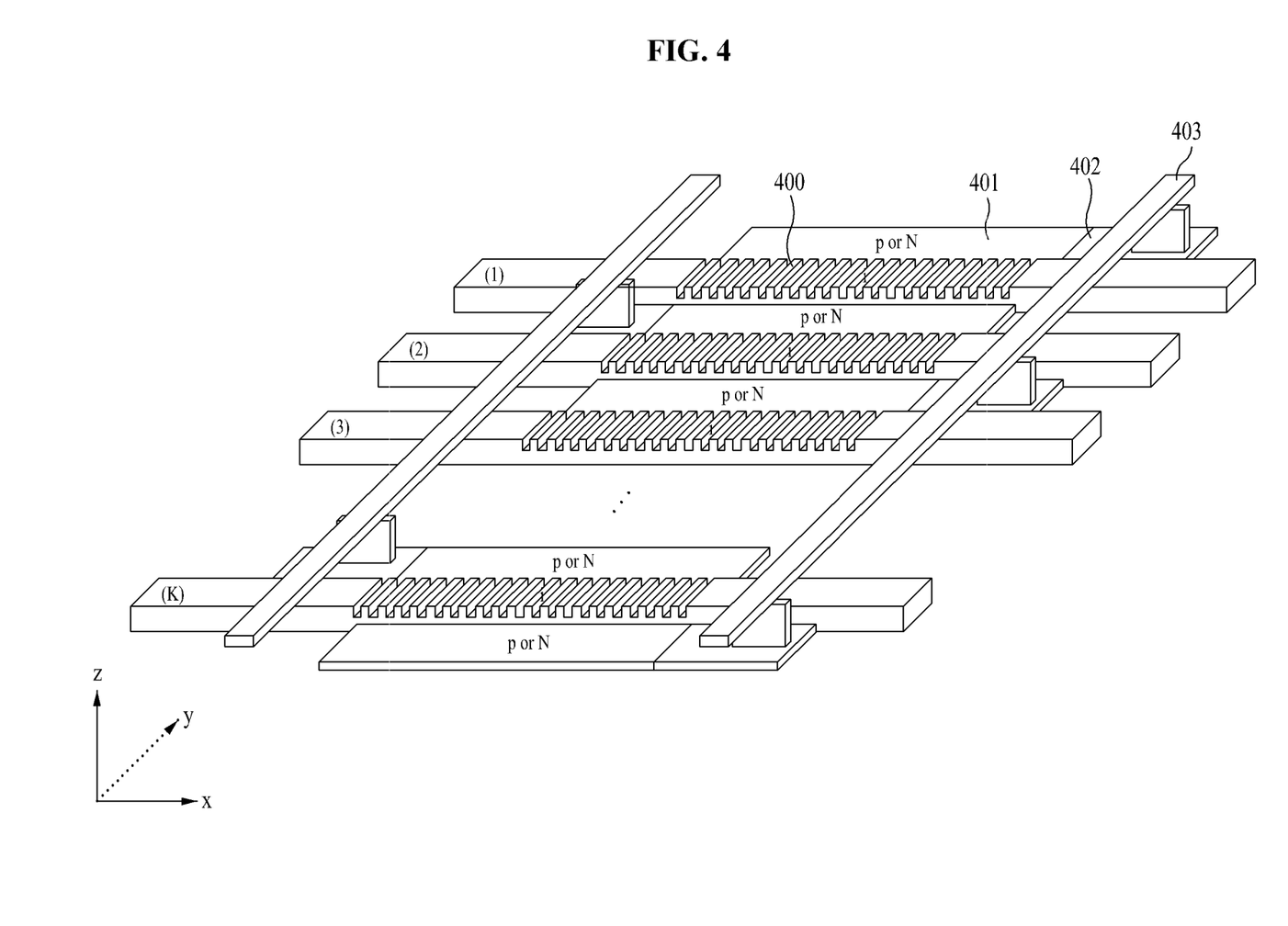
FIG. 4 is a drawing schematically illustrating a structure of a tunable TRx antenna array according to an embodiment of the inventive concept.

FIG. 4 is a drawing schematically illustrating a structure of a tunable TRx antenna array according to an embodiment of the inventive concept.

Because a semiconductor-based optical phased array antenna is generally implemented in a grating structure, an embodiment of the inventive concept assumes an antenna of a grating structure and presents a detailed example.

In FIG. 1, an optical wave incident to one 1×K optical phased array 120 among first to Mth optical phased arrays through a 2×M optical switch 104 may be controlled in phase to a desired value while passing through a 1×K power distributor 121, a phase controller array 122, and an optical waveguide 123, and may then be incident to a tunable TRx antenna array 124.

In this case, a device system according to an embodiment of the inventive concept may place a p or n type doped slab region 401, a p+ or n+ type doped slab region 402 of the same doping type as it, and an electrode 403 among respective i type grating radiators 400 constituting the tunable TRx antenna array 124, thus changing an effective refractive index of each i type grating radiator 400.

By arranging the device with the structure, the device system according to an embodiment of the inventive concept may change an effective refractive index of the i type grating antenna 400 using an electro-optic effect or a thermo-optic effect to continuously change an angle in a vertical direction of a TRx optical signal (e.g., a normal direction of the surface of a grating antenna).

As an example, when voltage or current is applied between the electrodes 403 in an array structure of arrangement such as p-i-n-i-p-i-n- ... -i-n, because there is a change in density of electrons and holes, that is, carriers in each i type grating antenna 400 depending to a size and applied direction thereof, the electro-optic effect may occur. In detail, the device system according to an embodiment of the inventive concept may change an effective refractive index of the i type grating radiator 400 by a free carrier plasma dispersion (FCPD) effect which is the electro-optic effect.

As another example, when voltage or current is applied between the electrodes 403 in an array structure of arrangement such as p-i-p- ... -i-p or n-i-n- ... -i-n, Joule heat may occur. Thus, as a temperature of the i type grating radiator 400 is changed, the thermo-optic effect may occur, thus changing the effective refractive index.

Figure 5:
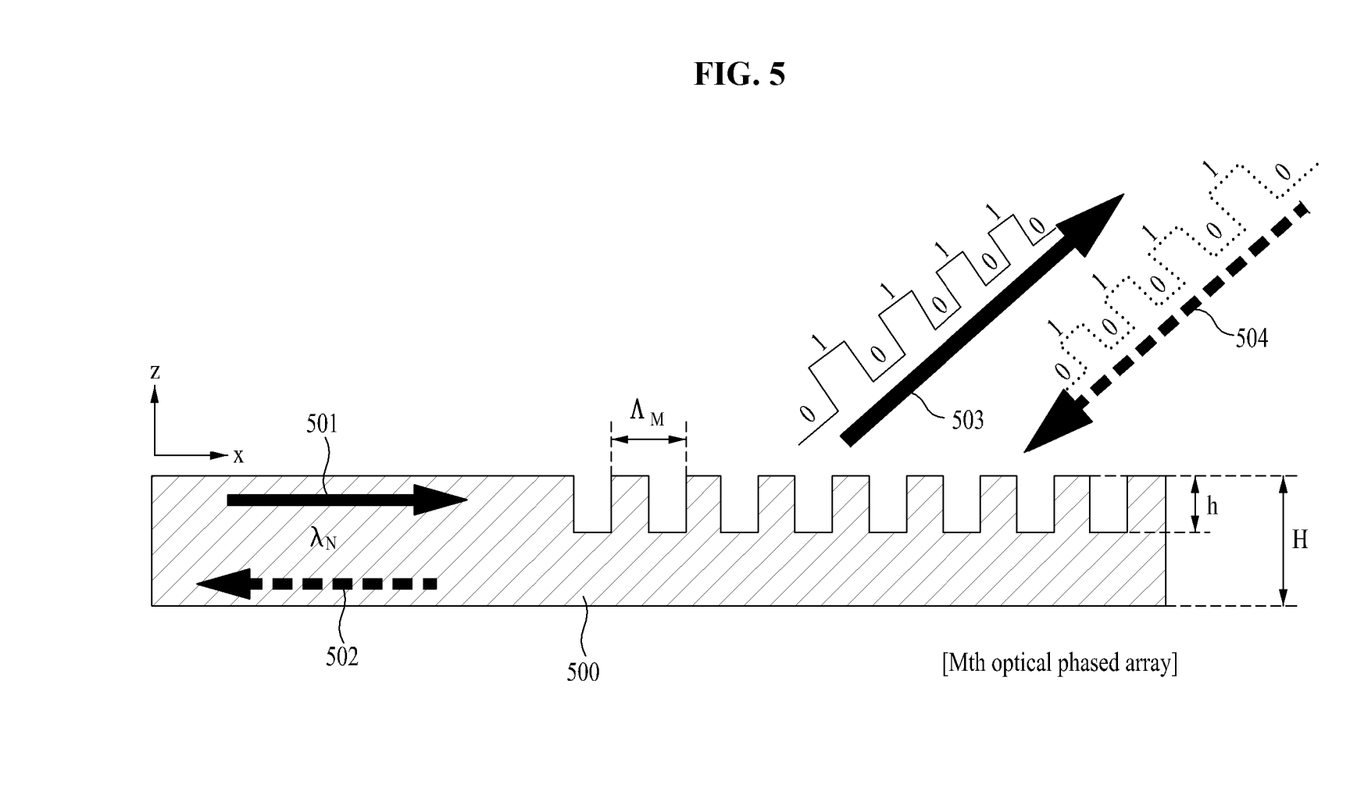
FIG. 5 is a drawing schematically illustrating a structure of transmitting and receiving an optical signal modulated into a specific signal with the free space via an optical modulator according to an embodiment of the inventive concept.

FIG. 5 is a drawing schematically illustrating a structure of transmitting and receiving an optical signal modulated into a specific signal with the free space via an optical modulator according to an embodiment of the inventive concept.

In FIG. 1, after an optical signal is modulated into a specific signal through an optical modulator 110, when the modulated optical signal is incident to a 1×K optical phased array 120 or 500, the optical signal from a phase controller 501 may be modulated and the modulated Tx optical signal 141 or 503 may be radiated (transmitted) to the free space. Thereafter, the optical signal radiated to the free space may be reflected from a specific object and may then be incident (or received) to one 1×K optical phased array 120 among first to Mth optical phased arrays through a tunable TRx antenna array 124. Thus, the modulated Rx optical signal 142 or 504 may be towards a photodetector 130 (see reference numeral 502) and may be converted and detected into an electrical signal through the photodetector 130 connected to one of input ports of a 2×M optical switch 104.

An optical modulator according to an embodiment of the inventive concept may be a structure constructed based on a Mach-Zehnder interferometer or a ring resonator. Because a semiconductor-based optical modulator is well known in a related technology field, a detailed description thereof will be omitted.

Figure 6A:
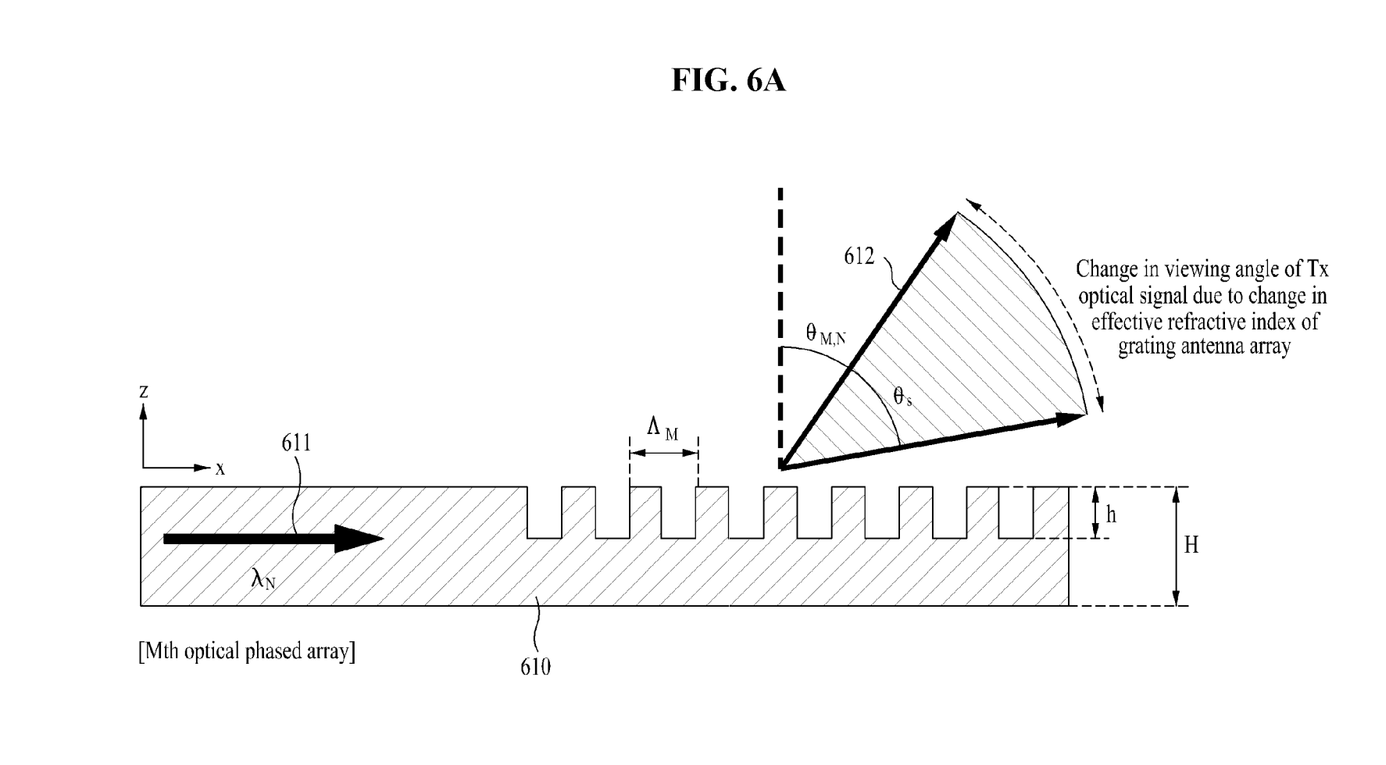
FIGS. 6A and 6B are drawings schematically illustrating a structure of modulating a vertical direction angle of a TRx optical signal using a tunable TRx antenna array according to an embodiment of the inventive concept.
Figure 6B:
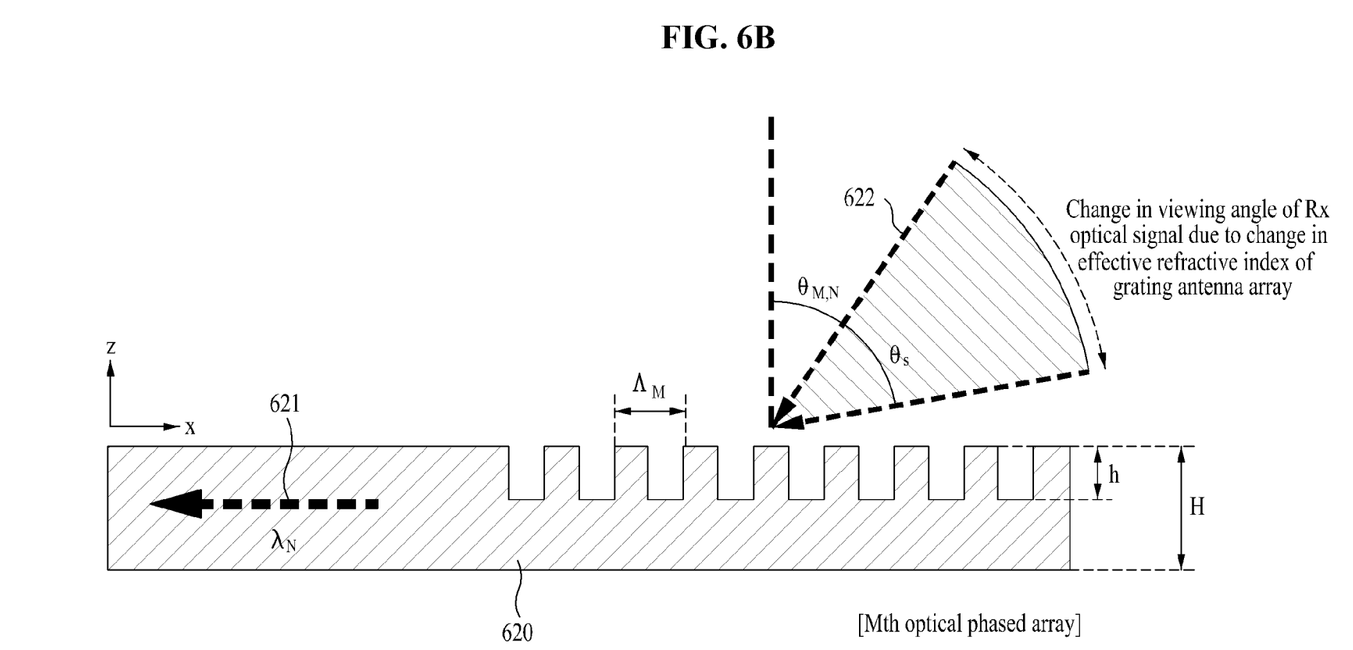

FIGS. 6A and 6B are drawings schematically illustrating a structure of modulating a vertical direction angle of a TRx optical signal using a tunable TRx antenna array according to an embodiment of the inventive concept.

In detail, FIG. 6A illustrates a structure of modulating an angle in a vertical direction of a Tx optical signal (e.g., a normal direction of the surface of a grating antenna array 610), and FIG. 6B illustrates a structure of modulating an angle in a vertical direction of an Rx optical signal (e.g., a normal direction of the surface of a grating antenna array 620).

FIGS. 6A and 6B illustrate a structure capable of changing effective refractive indexes of the grating antenna arrays 610 and 620 by an electro-optic or thermo-optic effect and modulating a viewing angle in a vertical direction of TRx optical signals 612 and 622 according to an embodiment of a structure of a tunable TRx grating antenna array shown in FIG. 4.

Referring to FIG. 6A, a radiation angle of an optical wave radiated from the structure of the grating antenna array 610 to the free space may be represented using Equation 1 below by the diffraction principle.

$$\sin \theta_{M,N} = n_{eff} - \lambda_N / \Lambda_M \quad \text{[Equation 1]}$$

Herein, $\lambda_N$ denotes the wavelength of the incident optical wave, and $\Lambda_M$ denotes the grating period of the grating antenna array of the 1×K optical phased array to which the optical wave selected through the 2×M optical switch is incident. Furthermore, $n_{eff}$ denotes the effective refractive index of the grating antenna, and $\theta_{M,N}$ denotes the radiation angle in the vertical direction (the normal direction of the surface of the grating antenna array 610).

In detail, when an optical wave 611 which is incident from a phase controller and has a wavelength of $\lambda_N$ is waveguided to the grating antenna array 610 having a grating period of $\Lambda_M$, it may be scattered due to a periodic grating structure of the antenna. In this case, a radiation angle corresponding to the center with the highest intensity of light in a diffraction pattern formed by diffraction may be $\theta_{M,N}$, and $n_{eff}$ may be determined based on a material structure of the grating antenna and a refractive index according to a wavelength of the optical wave.

As seen in Equation 1 above, an embodiment of the inventive concept may change a $n_{eff}$ value through an electro-optic or thermo-optic effect, thus continuously modulating a radiation angle in a vertical direction (a normal direction of the surface of a grating antenna array) within a $\theta_S$ size range. In this case, the $\theta_S$ value may be determined according to magnitude of a change in $n_{eff}$ value according to the electro-optic or thermo-optic effect.

Like transmission, Equation 1 above is applicable to reception shown in FIG. 6B. An Rx angle may be continuously modulated within $\theta_S$ size range in the same manner as the transmission shown in FIG. 6A. Thus, the received optical signal 622 may be towards a photodetector (see reference numeral 621) and may be converted and detected into an electrical signal through the photodetector connected to one of input ports of a 2×M optical switch.

Figure 7:
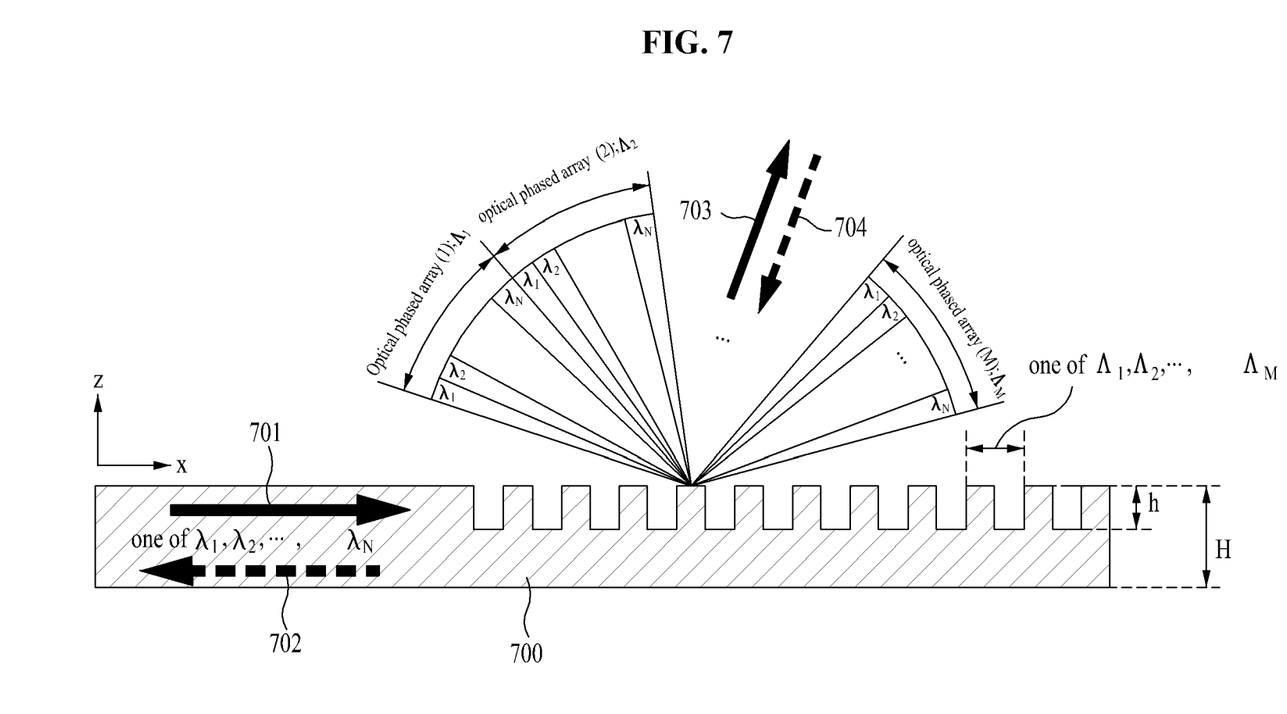
FIG. 7 is a drawing schematically illustrating a structure of a device system for constituting a 3D image sensor for performing wireless data transmission and reception of an optical signal using a vertical direction viewing angle of a wide range according to an embodiment of the inventive concept.

FIG. 7 is a drawing schematically illustrating a structure of a device system for constituting a 3D image sensor for performing wireless data transmission and reception of an optical signal using a vertical direction viewing angle of a wide range according to an embodiment of the inventive concept.

Referring to FIG. 7, the device system for constituting the 3D image sensor capable of performing the wireless data transmission and reception of the modulated optical signal based on the optical phased array according to an embodiment of the inventive concept may perform wireless data transmission and reception of an optical signal using a vertical viewing angle which is very wide by using all of a structure of selecting an optical wave having N wavelengths through a 1×N laser diode array, a structure of selectively inputting an optical wave to one of respective 1×K optical phased arrays having M grating periods through a 2×M optical switch, and a structure capable of modulating a viewing angle in a vertical direction of a TRx optical signal (e.g., a normal direction of the surface of a grating antenna) in a specific range through a tunable TRx antenna array.

As shown in FIG. 7, when inputting an optical signal having a wavelength of $\lambda_1, \lambda_2, \lambda_3, \ldots, \lambda_N$ to a grating antenna array 700 of a corresponding 1×K optical phased array having a specific grating period using a 1×N laser diode array and radiating (transmitting) the optical signal on the free space (see reference numeral 703), an embodiment of the inventive concept may transmit the optical signal at specific N angles and may continuously change an angle range between N angles using an electro-optic effect or a thermo-optic effect through the tunable TRx antenna array. Thereafter, an Rx optical signal 704 which is reflected and returned from an object may be towards a photodetector (see reference numeral 702) and may be converted and detected into an electrical signal through the photodetector connected to one of input ports of an optical switch.

The device system according to an embodiment of the inventive concept may set a viewing angle range of an angle in a vertical direction (e.g., a normal direction of the surface of a grating antenna), which is capable of transmitting an optical signal using a specific 1×K optical phased array, to suit each design variable such that first to Mth 1×K optical phased arrays 700 are not overlapped with each other (or such that the overlapped range is minimized), thus performing wireless data transmission 703 of the optical signal at a viewing angle in a vertical direction in a very wide range. Furthermore, the reception 704 may be performed while having a viewing angle in a vertical direction in a very wide range in the same manner as the transmission 703.

Meanwhile, in general, it is obvious to those skilled in the art that the expansion of a viewing angle in a horizontal direction in an optical phased array-based sensor may be relatively easily implemented by setting an interval between antennas constituting the optical phased array to be close to a half of an operation wavelength or non-uniformly designing an interval between the antennas. Thus, when suitably performing the variable design and arrangement of each device using the method presented in an embodiment of the inventive concept, wireless data transmission and reception of the optical signal modulated using a very wide range may be performed at a viewing angle in a vertical direction (a normal direction of the surface of a grating antenna) as well as a viewing angle in a horizontal direction.

According to an embodiment of the inventive concept, a 3D image sensor capable of simultaneously performing wireless data transmission and reception of an optical signal modulated using a viewing angle of a very wide range on a PIC chip, may be implemented, without using an external optical modulator and a separate receiver, by applying the arrangement, structure, driving method of a plurality of optical devices to an existing optical phased array-based sensor.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A device system for constituting a three-dimensional (3D) image sensor capable of performing wireless data transmission and reception of a modulated optical signal based on optical phased array, the device system comprising:
   an optical modulator configured to be integrated on the same photonic integrated circuit (PIC) chip as a laser diode array with different output wavelengths and a multiplexer for transmitting an optical wave having a wavelength selected from the laser diode array to an optical waveguide and modulate the optical wave into a specific optical signal;
   an optical phased array configured to radiate the optical signal received via an optical switch to the free space using a tunable transmit and receive (TRx) antenna array; and
   a photodetector configured to convert an Rx optical signal received by a Tx optical signal transmitted via the optical phased array into an electrical signal.

2. The device system of claim 1, wherein the optical phased array includes the tunable TRx antenna array indicating a shape of a grating antenna array connected to each output port of the optical switch, and
   wherein a grating period value of the grating antenna array is differently designed and arranged in a plurality of optical phased arrays.

3. The device system of claim 1, wherein the optical phased array places a p or n type doped slab region between respective antennas constituting the tunable TRx antenna array and expands a TRx viewing angle range in a vertical direction depending on doping type arrangement of the slab region.

4. The device system of claim 1, wherein the optical modulator has a structure constructed based on a Mach-Zehnder interferometer or a ring resonator.

5. The device system of claim 1, wherein the Rx optical signal is converted and detected into an electrical signal through the optical switch by means of the photodetector connected to one of input ports of the optical switch.

6. The device system of claim 1, further comprising:
   a plurality of single wavelength light sources configured to expand a wireless transmission and reception viewing angle of the optical signal.

7. The device system of claim 1, wherein the optical modulator and the photodetector are integrated and arranged together on the same PIC chip as the optical phased array to perform the wireless data transmission and reception of the optical signal on the free space.

8. The device system of claim 1, wherein transmission and reception in a vertical direction of the Tx optical signal is performed using the optical phased array having a grating antenna array of different grating periods, the grating antenna array being connected to each output port of the optical switch.

9. The device system of claim 8, wherein the laser diode array selects one of optical waves, each of which has a different wavelength, and changes a TRx angle in a vertical direction,
   wherein the tunable TRx antenna array plays a role as transmission and reception of an angle range corresponding to the changed TRx angle range, and
   wherein the optical phased array expands a TRx viewing angle range for a vertical direction of the Tx optical signal.

10. A device system for constituting a 3D image sensor capable of performing wireless data transmission and reception of a modulated optical signal based on optical phased array, the device system comprising:
    a laser diode array configured to include a plurality of laser diodes, each of which has a different output wavelength;
    a multiplexer configured to receive an optical wave having a wavelength selected among optical waves, each of which has a different wavelength, from the laser diode array through each optical waveguide and transmit the received optical wave to one optical waveguide;
    an optical modulator configured to be integrated on the same PIC chip as the laser diode array and the multiplexer and modulate the optical wave into a specific optical signal;
    an optical switch configured to selectively transmit and receive the optical signal modulated through the optical modulator with a specific output port of an optical phased array;
    a tunable TRx antenna array configured to constitute the optical phased array and radiate the optical signal incident to any optical phased array through the optical switch to the free space; and
    a photodetector configured to convert an Rx optical signal received by a Tx optical signal transmitted via the tunable TRx antenna array into an electrical signal.

11. The device system of claim 10, wherein the multiplexer is formed in a structure based on a Y-branch optical waveguide or a structure based on a ring resonator.

12. The device system of claim 11, wherein the structure based on the Y-branch optical waveguide includes a tapered optical waveguide and an inverse tapered optical waveguide.

13. The device system of claim 11, wherein the structure based on the ring resonator includes a plurality of ring resonators, each of which is formed with a different radius.

14. The device system of claim 10, wherein the optical switch is disposed in a plurality of multiple stages or is implemented as one device.

15. A device system for constituting a 3D image sensor capable of performing wireless data transmission and reception of a modulated optical signal based on optical phased array, the device system comprising:

an optical modulator configured to be integrated on the same photonic integrated circuit (PIC) chip as a laser diode array with different output wavelengths and a multiplexer for transmitting an optical wave having a wavelength selected from the laser diode array to an optical waveguide and modulate the optical wave into a specific optical signal;

an optical phased array configured to radiate the optical signal received via an optical switch to the free space using a tunable TRx antenna array; and a photodetector configured to convert an Rx optical signal received by a Tx optical signal transmitted via the optical phased array into an electrical signal, wherein the optical phased array includes the tunable TRx antenna array indicating a shape of a grating antenna array connected to each output port of the optical switch, and wherein a grating period value of the grating antenna array is differently designed and arranged in a plurality of optical phased arrays.

16. The device system of claim 15, wherein the optical phased array supplies voltage or current to the grating antenna array to change an effective refractive index of a grating antenna constituting the grating antenna array and expands a viewing angle range in a vertical direction of the grating antenna to transmit and receive the optical signal.

* * * * *